No. 758,550. PATENTED APR. 26, 1904.
W. H. MERRITT & J. C. WALL.
POWER TRANSMITTER.
APPLICATION FILED MAY 5, 1903.
NO MODEL. 2 SHEETS—SHEET 2.
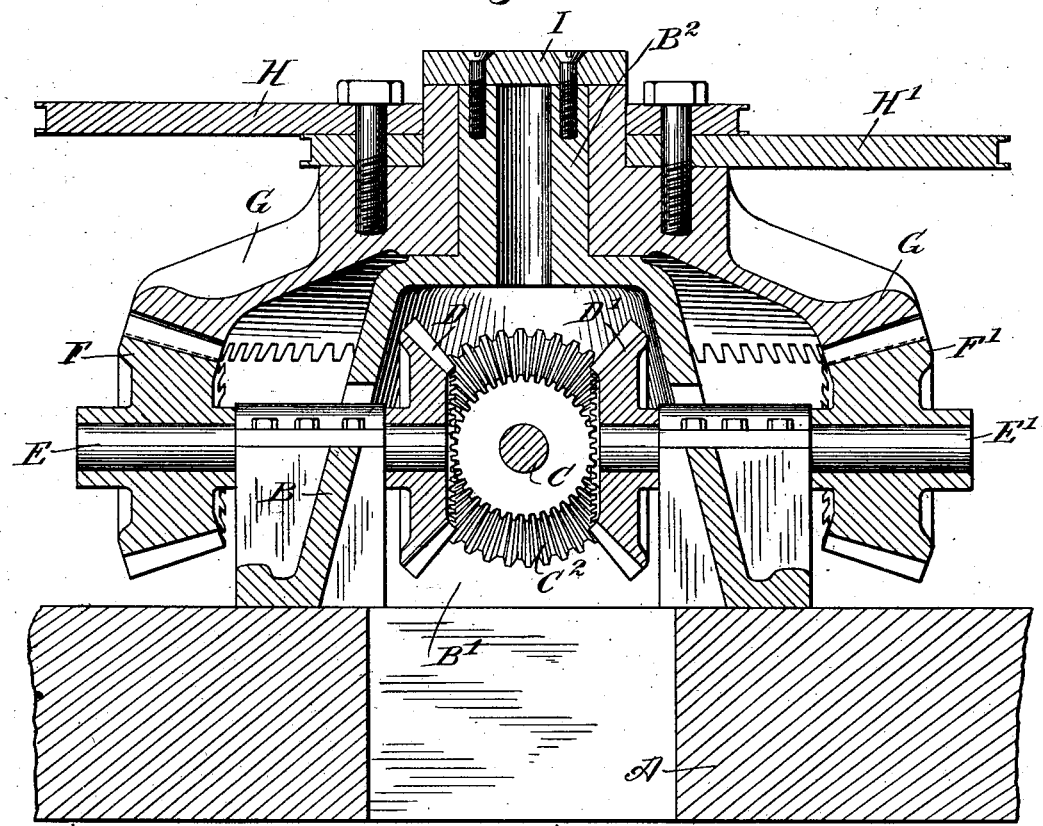

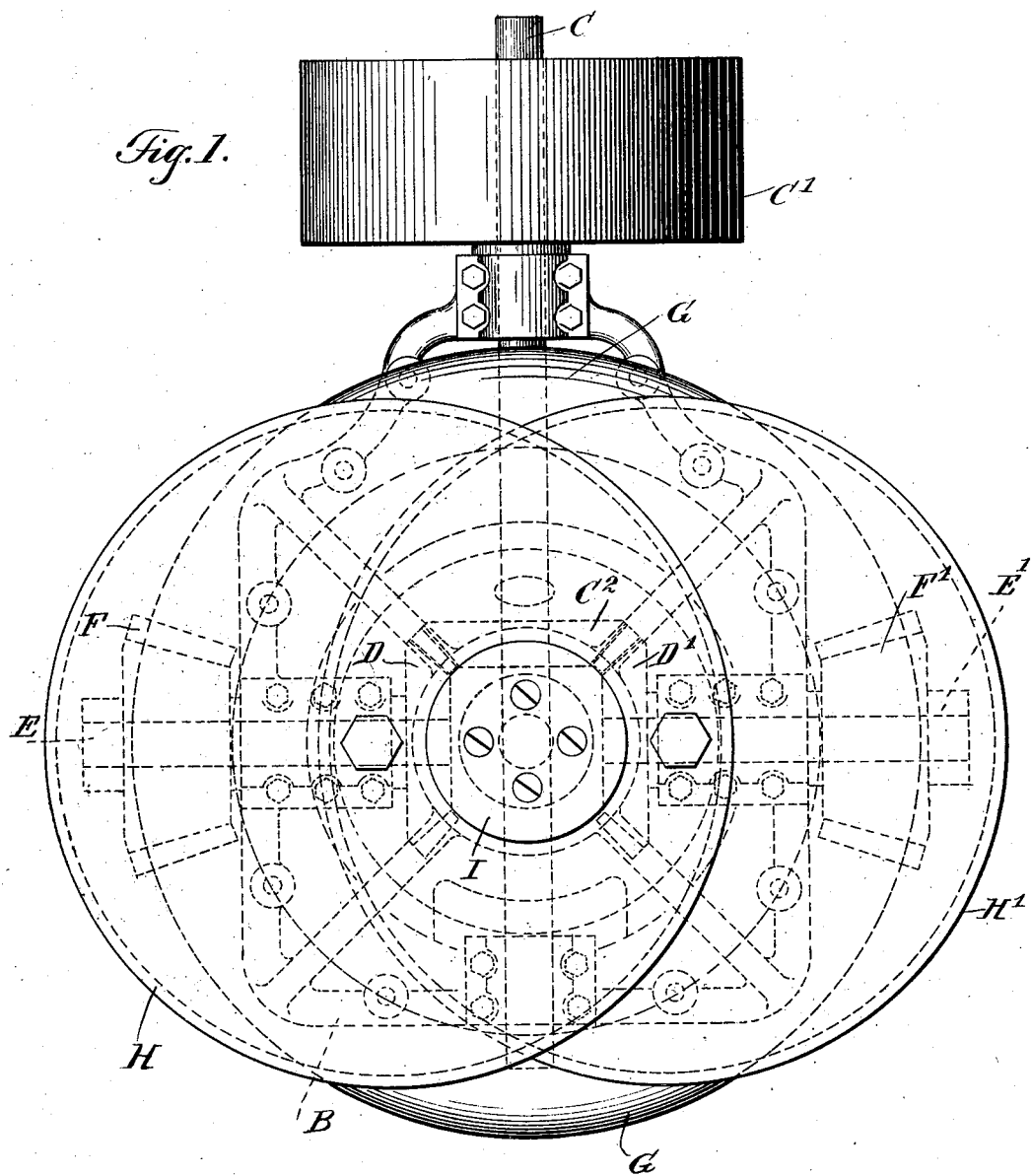

No. 758,550. Patented April 26, 1904.

UNITED STATES PATENT OFFICE.

WILLIAM H. MERRITT AND JOHN C. WALL, OF GENESEE, NEW YORK; SAID WALL ASSIGNOR TO SAID MERRITT.

POWER-TRANSMITTER.

SPECIFICATION forming part of Letters Patent No. 758,550, dated April 26, 1904.

Application filed May 5, 1903. Serial No. 155,722. (No model.)

*To all whom it may concern:*

Be it known that we, WILLIAM H. MERRITT and JOHN C. WALL, both citizens of the United States, and residents of Genesee, in the county of Allegany and State of New York, have invented a new and Improved Power-Transmitter, of which the following is a full, clear, and exact description.

The object of the invention is to provide a new and improved power-transmitter which is simple and durable in construction, very effective in operation, and arranged for transmitting the power of a motor or the like to pumps or other machines in such a manner as to equalize the strain and to insure a uniform and easy running of the machine.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in both views.

Figure 1 is a plan view of the improvement, and Fig. 2 is a sectional side elevation of the same.

On a suitable foundation A is bolted or otherwise secured the main frame B, in which is journaled a transversely-extending shaft C, carrying a pulley C' and connected by belt with a motor or like driving power for imparting a rotary motion to the said shaft C. On the latter and within a chamber B', formed in the frame B, is secured a bevel gear-wheel C² in mesh on opposite sides with bevel gear-wheels D and D', secured on the inner ends of auxiliary shafts E and E', standing at right angles to the shaft C and likewise journaled in suitable bearings carried by the frame B.

On the outer ends of the auxiliary shafts E E' are fastened bevel gear-wheels F and F' in mesh on opposite sides with a master gear-wheel G, mounted to rotate on a stud B², integrally formed on the top of the frame B directly over the chamber B', as plainly illustrated in the drawings.

On the master-wheel G are bolted or otherwise secured eccentrics H and H', connected by eccentric straps and rods with the pump or other machine to be actuated, and the said eccentrics H and H' are arranged diametrically opposite each other on opposite sides of the master-wheel G, so as to equalize all strain and insure an easy running of the machine, especially as the transmission of the power from the main shaft C to the auxiliary shafts E E' and from the latter by the gear-wheels F F' to the master-wheel G is likewise on opposite sides of the latter. The eccentrics H and H' are preferably made solid, as indicated in the drawings, and upward movement of the master gear-wheel G is prevented by a cap I, secured on the top of the stud B² and extending over the outer end of the hub of the master gear-wheel G.

From the foregoing it will be readily seen that all strain incident to the transmission of the power is equalized, and consequently uniform and easy running of the machine is insured.

The device is more particularly designed for use in oil-fields for working a plurality of pumps long distances apart. It frequently happens that more wells are to be pumped on one side of the machine than on the other side. Hence if an ordinary crank-arm or wrist-pin is used on the master-wheel instead of eccentrics the strain is unequal on the master-wheel and the latter turns by jerks. This is avoided by the use of the eccentrics, of which one is coupled with one half of the pumps and the other eccentric actuates the other half of the pumps.

Having thus described our invention, we claim as new and desire to secure by Letters Patent—

1. A power-transmitter comprising a frame having a chamber formed therein, a driven shaft, extending within said chamber, a master-wheel, a stud on the top of the frame above the chamber and on which the master-wheel is mounted to rotate, means for transmitting power from the driven shaft to the master-wheel on opposite sides of the latter, and eccentrics mounted on the hub of the master-wheel and secured thereto, as set forth.

2. A power-transmitter comprising a frame having a central chamber, a driven shaft journaled in said frame, a gear-wheel carried by said shaft, auxiliary shafts at angles to the driven shaft, two gear-wheels carried by each of said shafts, of which the inner gear-wheel is in mesh with the driven-shaft gear-wheel, and a master gear-wheel mounted to turn above the said chamber and in mesh with the outer gear-wheels on the auxiliary shafts, as set forth.

3. A power-transmitter comprising a driven shaft, a gear-wheel carried by said shaft, auxiliary shafts at angles to the driven shaft, two gear-wheels carried by each of said shafts, of which the inner gear-wheel is in mesh with the driven-shaft gear-wheel, a master gear-wheel in mesh with the outer gear-wheels on the auxiliary shafts, and eccentrics secured on the master-wheel, diametrically on opposite sides of the center of the master-wheel, as set forth.

4. A power-transmitter comprising a frame having a central chamber, a stud extending from the top of the chamber, a driven shaft journaled in the said frame, a gear-wheel carried by the shaft inside of the said chamber, bevel gear-wheels in mesh with the said driven-shaft gear-wheel, on opposite sides thereof, auxiliary shafts journaled in the said frame and extending at right angles to the driven-shaft, the said auxiliary shafts carrying said bevel gear-wheels on their inner ends, gear-wheels on the outer ends of the said auxiliary shafts, and a master gear-wheel, mounted to turn on the said stud and in mesh with the said gear-wheels on the outer ends of the said auxiliary shafts, as set forth.

5. A power-transmitter comprising a frame having a central chamber, a stud extending from the top of the chamber, a driven shaft journaled in the said frame, a gear-wheel carried by said shaft inside of the said chamber, bevel gear-wheels in mesh with the said driven-shaft gear-wheel, on opposite sides thereof, auxiliary shafts journaled in the said frame and extending at right angles to the driven shaft, the said auxiliary shafts carrying said bevel gear-wheels on their inner ends, gear-wheels on the outer ends of the said auxiliary shafts, a master gear-wheel, mounted to turn on the said stud and in mesh with the said gear-wheels on the outer ends of the said auxiliary shafts, and solid eccentrics secured on the said master gear-wheel and arranged diametrically on opposite sides of the center of the master gear-wheel, as set forth.

6. A power-transmitter, comprising a frame having a central chamber, a stud extending from the top of the frame above the chamber, a driven shaft journaled in the frame, a gear-wheel carried by said shaft within the said chamber, a master gear-wheel having a hub mounted to turn on the said stud, means for driving the master gear-wheel from the gear-wheel on the driven shaft, eccentrics secured to the master-wheel, and a cap secured on the top of the stud and extending over the outer end of the hub of the master gear-wheel, as set forth.

In testimony whereof we have signed our names to this specification in the presence of two subscribing witnesses.

WILLIAM H. MERRITT.
JOHN C. WALL.

Witnesses:
W. T. BLISS,
ALBERT MATSON.